United States Patent [19]

Strömberg

[11] E Patent Number: Re. 31,944

[45] Reissued Date of Patent: Jul. 16, 1985

[54] METHOD AND APPARATUS FOR TRANSFORMING BY PRESSING VOLUMINOUS MATERIAL INTO BALES

[75] Inventor: Nils E. Strömberg, Sundsvall, Sweden

[73] Assignee: Sunds Defibrator Aktiebolag, Sweden

[21] Appl. No.: 183,194

[22] Filed: Sep. 2, 1980

Related U.S. Patent Documents

Reissue of:

[64] Patent No.: 4,162,603
Issued: Jul. 31, 1979
Appl. No.: 897,121
Filed: Apr. 17, 1978

[51] Int. Cl.[3] ..... B65B 1/24

[52] U.S. Cl. ..... 53/438; 100/207; 141/12; 141/71; 53/502; 53/529

[58] Field of Search ..... 53/436, 438, 502, 529, 53/530, 523, 527; 141/12, 71; 100/3, 7, 45, 99, 193, 207, 218

[56] References Cited

U.S. PATENT DOCUMENTS

| | | | |
|---|---|---|---|
| 716,422 | 12/1902 | Holscher | 100/218 |
| 2,822,750 | 2/1958 | Austin . | |
| 2,869,296 | 1/1959 | Overman | 53/438 |
| 2,955,529 | 10/1960 | Marble | 100/218 |
| 3,117,513 | 1/1964 | Burnett | 53/529 |
| 3,161,124 | 12/1964 | Stromberg | 100/99 |
| 3,449,261 | 3/1970 | Hollhorst | 53/529 |
| 3,541,948 | 11/1970 | Sauer | 100/7 |
| 3,576,161 | 4/1971 | Wright | 100/7 |
| 3,608,476 | 9/1971 | Price | 100/218 |
| 3,613,556 | 10/1971 | Wright | 100/3 |
| 3,693,541 | 9/1972 | Lombard | 100/218 |
| 3,694,992 | 10/1972 | Hunt | 53/438 |
| 3,795,084 | 3/1974 | Richardson | 53/529 |
| 3,874,281 | 4/1975 | Conner | 100/35 |
| 3,908,539 | 9/1975 | O'Brien | 100/218 |
| 3,977,155 | 8/1976 | Spaulding | 53/529 |
| 4,006,679 | 2/1977 | Egosi | 100/218 |
| 4,040,230 | 8/1977 | Pessel | 53/502 |

FOREIGN PATENT DOCUMENTS

| | | |
|---|---|---|
| 686725 | 5/1964 | Canada . |
| 339173 | 9/1971 | Sweden . |
| 965906 | 8/1964 | United Kingdom . |
| 1097016 | 12/1967 | United Kingdom . |
| 1280932 | 7/1972 | United Kingdom . |
| 1324212 | 7/1973 | United Kingdom . |

*Primary Examiner*—John Sipos
*Attorney, Agent, or Firm*—Lerner, David, Littenberg, Krumholz & Mentlik

[57] ABSTRACT

Disclosed is a method and apparatus for pressing and binding voluminous material into bales, in which material in the form of several layers is supplied through a closable opening into a pressing chamber where compression takes place of each supplied layer. Final pressing is carried out at high pressure after a desired number of layers have been supplied into the pressing chamber, whereafter the pressing effect is lowered to a substantially lower pressure, so that the material compressed into a bale is permitted to expand, and the bale thereafter is discharged from said pressing chamber through a closable opening and bound while said substantially lower pressure is being maintained.

25 Claims, 31 Drawing Figures

METHOD AND APPARATUS FOR TRANSFORMING BY PRESSING VOLUMINOUS MATERIAL INTO BALES

Matter enclosed in heavy brackets [ ] appears in the original patent but forms no part of this reissue specification; matter printed in italics indicates the additions made by reissue.

BACKGROUND OF THE INVENTION

This invention relates to a method and an apparatus for transforming voluminous material, particularly textile fibres, by pressing the material into bales.

With known baling presses the bales are packed and bound in a press. A usual procedure is to attach a planar sheet to the surfaces of the press die and press table before the final pressing operation takes place. After the final pressing is completed, the sheets are folded over the long sides of the bale. The short sides are covered with loose sheets, which sheets are attached by sewing to the remaining packing. Typically, two compression-molded hoods are attached to the press die and press table prior to the final pressing operation and then are heeled manually over the completely pressed bale. This can be carried out after the mold covers have been opened. Laminated polyethylene fabric is usually used as a packing material.

The pressed and packed bales then are bound at full pressing effect with metal wires or strips, which are cut to suitable lengths and provided with eyes or stampings for securely hooking them together. Each bale normally is bound with seven wires of 3 mm diameter or strips of 16 mm by 0.5 mm cross-section. In the lastmentioned case the cross-sectional area per strip is 8 $mm^2$. At a rated tensile strength of 100 kg per $mm^2$ the strips together can thus withstand an expansion force in the completed bale of $7\times2\times8\times100=11{,}200$ kg. Textile fibre material, however, is very expansive, which requires final compressing of the bale to a height substantially below the final bale height in order not to exceed the limiting force value of 11,200 kg. This requirement often results in compression forces of up to 250,000 kg corresponding to a specific pressure of 50 kg per $cm^2$ on a bale with a mold area of 5000 $cm^2$. After the ensuing expansion of the bale the corresponding area is about 5800 $cm^2$ and, consequently, the permissible maximum specific expansion pressure is 11,200 kg per 5800 $cm^2$, i.e. about 3 kg per $cm^2$. It should be apparent from the aforesaid that both the packing and binding with known arrangements is a complicated and expensive procedure. The work must be carried out manually in the press. A simpler method of packing and binding at a place other than in the press, under similar conditions as in the press, involves serious difficulties. The transport of the bale while maintaining a pressing force of 250,000 kg would imply very great forces, and the fibre easily would be damaged by friction heat.

An object of the present invention is to overcome the aforesaid shortcomings by providing a method and apparatus wherein the bale, after the final pressing in a pressing chamber, is permitted to expand in the press at a pressing effect substantially lower than the final pressing effect, whereafter the bale without the occurance of detrimental friction forces is moved out of the pressing chamber to a binding device while the aforesaid substantially lower pressing effect is maintained. The binding is carried out with tension in the binding wires or strips so that the completed bale does not appreciably expand after the removal of the pressing effect.

SUMMARY OF THE INVENTION

The foregoing and additional objects are obtained in accordance with the principles of this invention by providing an arrangement for producing bales of voluminous materials which includes a pressing chamber with a press die, wherein the chamber is provided with a closable opening in its upper portion for supplying layered material to the chamber, and the chamber has a closable opening in its lower portion for discharging compressed bales. The press die, after applying maximum pressure to the bale, partially releases the pressure on the bale, allowing the bale to expand somewhat. The bale is then transferred in the reduced pressure condition to a binding device which maintains the reduced pressure while the bale is being bound.

Before being introduced into the above-mentioned pressing chamber, the voluminous material is pressed into layers in a prepressing chamber. This chamber is fed with partial layers originating from a material supply shaft and partial layer compressing apparatus, which includes means for determining the weight of each partial layer. The whole system operates in an automatic sequential manner to produce well formed bales.

BRIEF DESCRIPTION OF THE DRAWING

The invention will be more clearly understood upon reading of the following detailed description in conjunction with reference to the accompanying drawing, wherein:

FIGS. 29a, b, and c are cross-sections along A—A in FIG. 20.

DETAILED DESCRIPTION

According to the embodiment shown of the apparatus, the fibre material to be pressed is caused to continuously fall down into a shaft 1, in which a first step of the pressing operation takes place. The material thereby is uniformly distributed over the cross-section of the shaft, so that a symmetric bale will be obtained. This is essential both for the pressing operation and for the subsequent handling and use of the bale.

Figure 4:
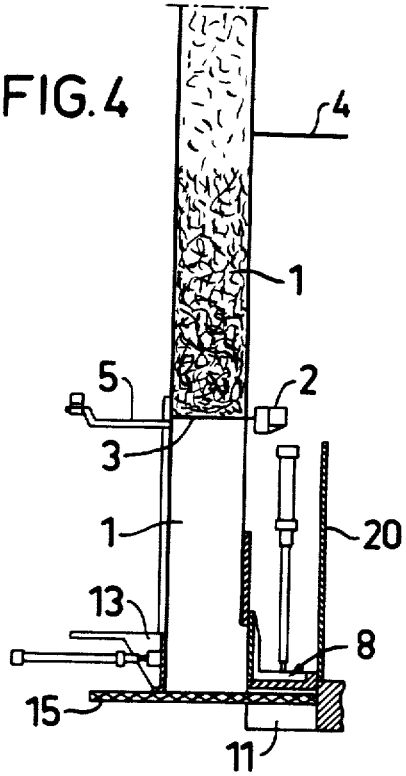
FIGS. 4–7 are longitudinal sections of that portion of the apparatus where the compression of the material takes place.
Figure 5:
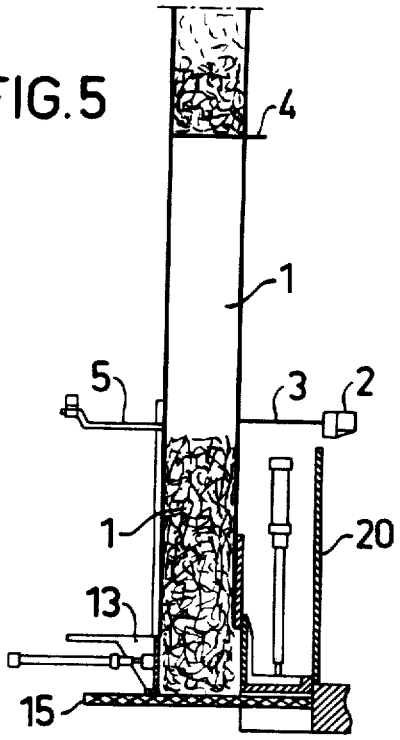
Figure 6:
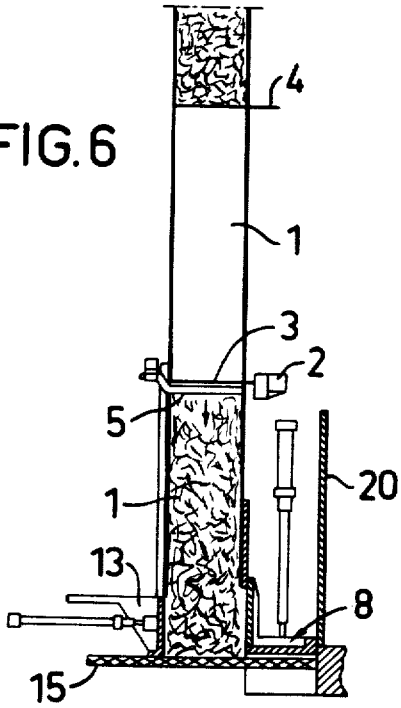

As shown in FIG. 4, the material is collected on and supported by a plate 3 connected to a weighing mechanism 2. When the weighing mechanism indicates full weight, a damper 4 is inserted which blocks the fibre material flow down the shaft 1. The plate 3 is then moved out of the shaft, and the material supported on the plate 3 drops down and fills the lower portion of the shaft. In the upper portion of the shaft new material supplied is carried by the damper 4 (as shown in FIG. 5). After a time delay chosen with respect to the falling speed of the fibre material, compression forks 5 are moved into the shaft through slots in one of the shaft walls. At the same time, the plate 3 is moved back into the shaft (as shown in FIG. 6). When the plate 3 has assumed its fully inserted position, the damper 4 is moved out and the fibre material carried thereon drops down onto the plate 3 (as shown in FIG. 7).

Figure 7:
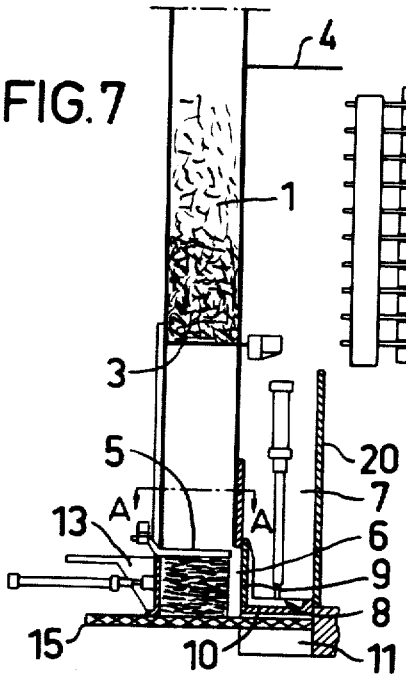
Figure 7A:
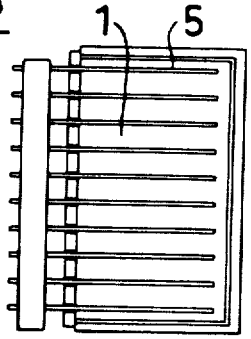
FIG. 7a is a cross-section along A—A in FIG. 7.

The fibre material is then compressed in the lower portion of the shaft by the forks 5 as they are forced downward to the upper edge of discharge opening 6 in the side surface of the shaft (as shown in FIG. 7). The discharge opening 6 connects the shaft 1 with a pre-pressing chamber 7, in which a second step of the pressing operation is carried out. In said chamber 7 a pre-press die 8 is provided. During the compression of the fibre material in the shaft, the opening 6 is held covered by a vertical plate 9 connected to the pre-press die 8. Said die 8 further comprises a horizontal plate 10 and downwardly projecting strips 11, which latter act upon the material at the pressing. Forks 15 extend into grooves between the strips 11.

Figure 8:
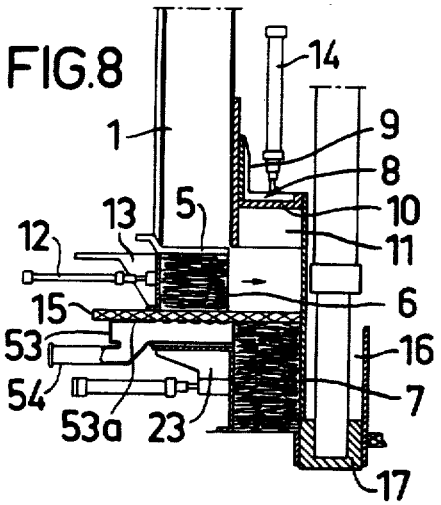
FIGS. 8–10 are longitudinal sections of that portion of the apparatus where the pre-pressing of the material take place.
Figure 9:
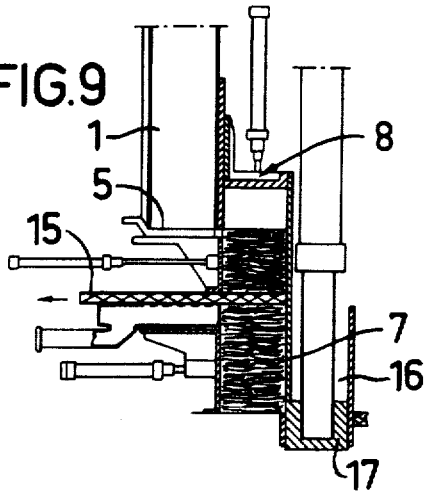
Figure 10:
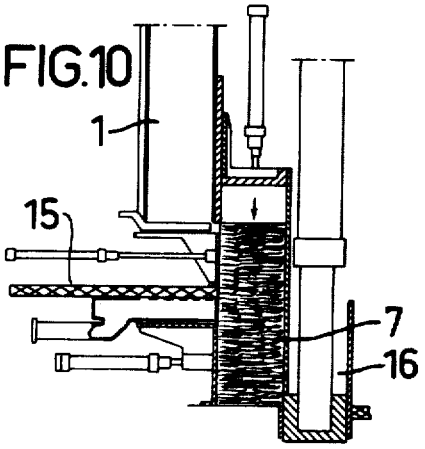

The introduction of the partial layers into the pre-pressing chamber 7 is effected by a lateral-movement device 13 operated by a hydraulic motor 12 (as shown in FIG. 8). Prior to this moment, the pre-press die 8 has been moved up by a hydraulic motor 14, so that the lower surfaces of the strips 11 are on the same level as or slightly above the upper defining edge of the opening 6. The material in the shaft 1 is obstructed to expand upwardly by the forks 5, and in the pre-pressing chamber 7 the forks 15 serve the same function to lie beneath fibre material already pre-pressed and at the same time to serve as a support path during the lateral movement of the fibre material out of the shaft 1. The lateral movement device 13 further comprises a horizontal plate-shaped portion, which closes the shaft 1 from beneath after completed lateral movement (as shown in FIG. 9). Thereafter the forks 15 are moved out from the pre-pressing chamber 7 and at the same time the forks 5 are returned to their starting position (see FIG. 10 and FIG. 4).

Figure 11:
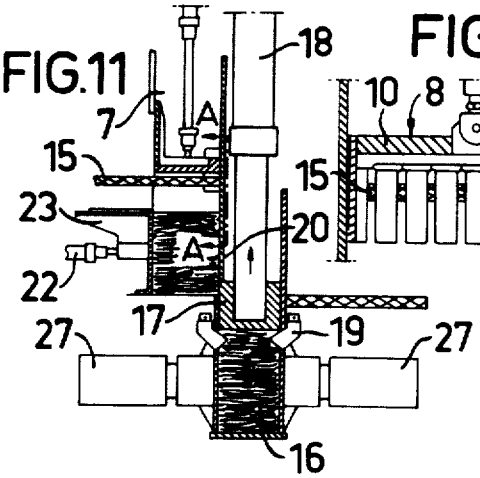
FIGS. 11–17 are longitudinal sections of that portion of the apparatus where the final pressing of the material takes place.
Figure 11A:
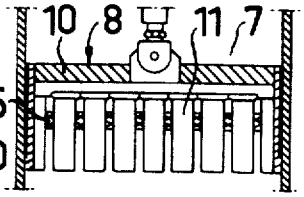
FIG. 11a is a view according to A—A in FIG. 11.

The fibre material introduced into the pre-pressing chamber 7 is then compressed afterwhich the forks 15 are moved back into the downwardly open grooves between the strips 11 on the plate 10 (see FIG. 11a).

The aforesaid pressing operations are repeated until a predetermined number of partial layers have been collected in the pre-pressing chamber 7. Said chamber preferably is four or five, according to the ingoing fibre density, and is adjustable. The remaining operations also take place automatically, so that no manual attendance is required. When a pre-determined number of said partial layers have been compressed to a layer, the prepress die 8 remains in its lower position. Said layer now is to be moved into a third step of the pressing operation, i.e. the final pressing. The final press comprises a pressing chamber 16 with associated press die 17, which is operated by a hydraulic motor 18. Stop members 19 prevent upward expansion of layers compressed previously (as shown in FIG. 11).

Figure 12:
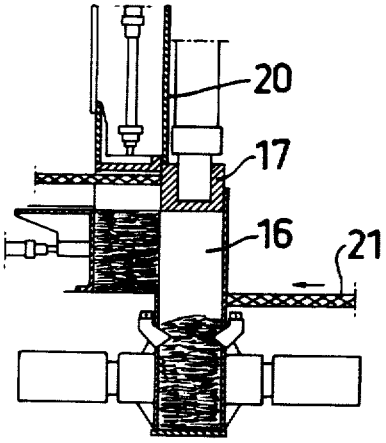
Figure 13:
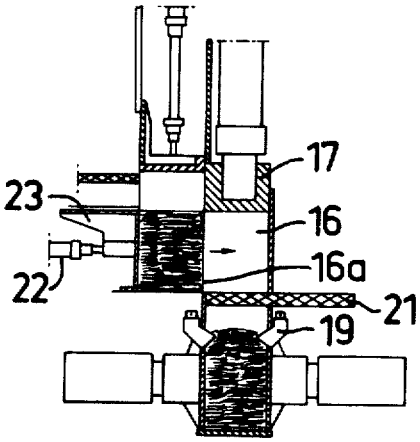
Figure 14:
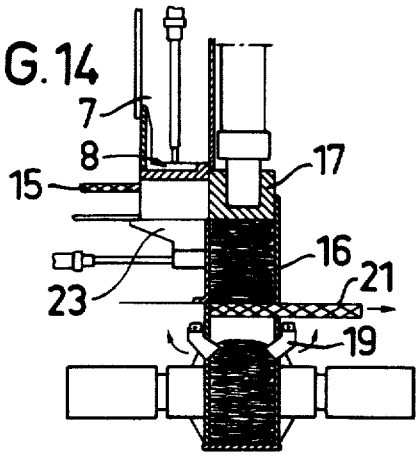

As shown in FIG. 12, for rendering possible the transfer of a layer from the pre-pressing chamber 7 to the pressing chamber 16, the press die 17 must be moved upward to the same level as the upper edge of the layer in the pre-press, and a wall 20 between the two chambers must be moved. This is effected in principle in a similar way as at the pre-pressing chamber 7. The wall 20 is attached to the press die 17 and follows along with the same upward motion so that an introduction of opening 16a is exposed (as shown in FIG. 12). When the press die 17 has reached the upper position, forks 21 are moved into the pressing chamber 16 (as shown in FIG. 13). The layers in the pre-pressing chamber 7 now can be moved in a lateral direction from the chamber 7 to the chamber 16, which movement is effected by a lateral force device 23 operated by a hydraulic motor 22, with the locking forks 21 serving as a vertical support. In connection therewith also a plate-shaped horizontal portion on the lateral force device 23 is moved in beneath the press die 8 (as shown in FIG. 14). When the lateral force device 23 has reached the inner position, the press die 8 in the pre-pressing chamber 7 returns to its upper position (as shown in FIG. 8), and a new partial layer can be supplied to the pre-pressing chamber 7 (as shown in FIG. 9).

Figure 15:
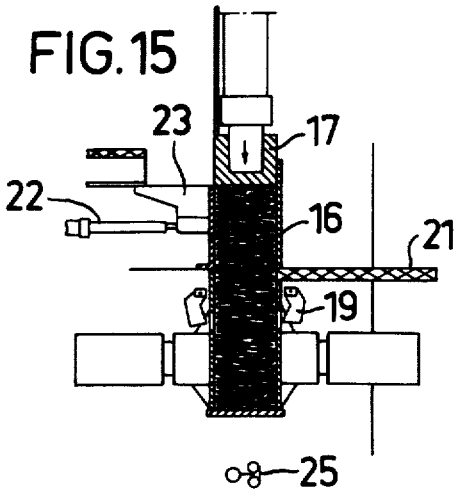
Figure 16:
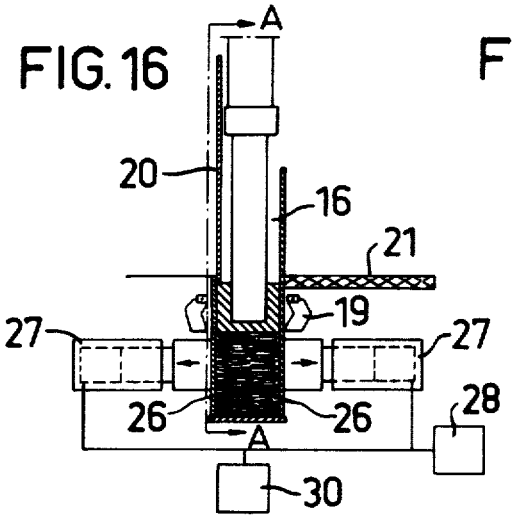
Figure 16A:
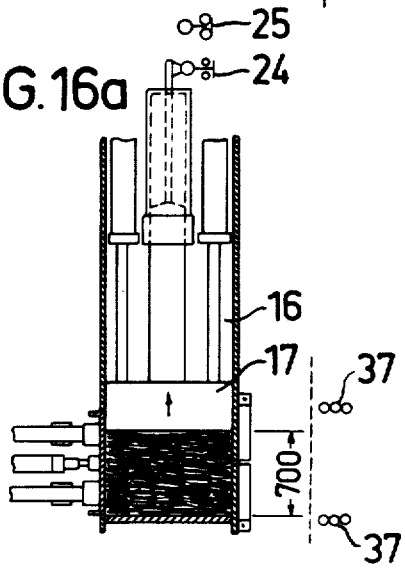
FIG. 16a is a lateral view according to A—A in FIG. 16.
Figure 17:
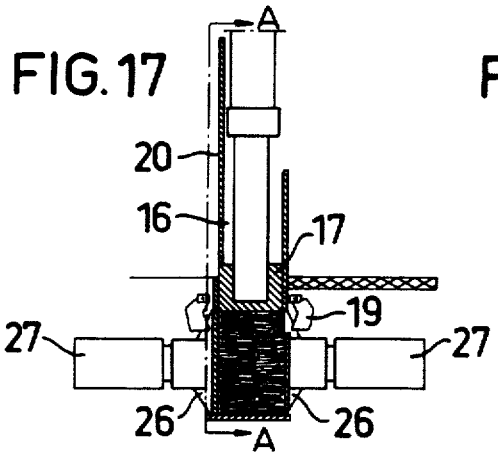
Figure 17A:
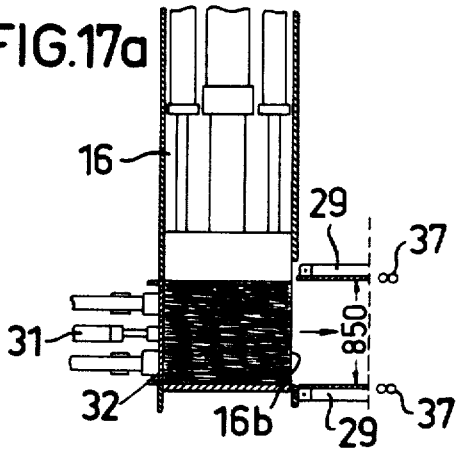
FIG. 17a is a lateral view according to A—A in FIG. 17.
Figure 18:
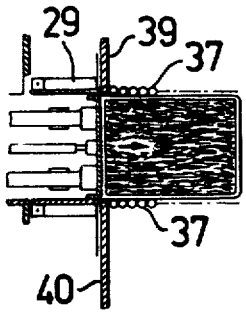
FIGS. 18–24 show different steps of the discharge and packing of the bale.
Figure 19:
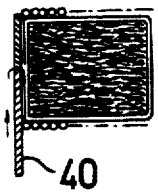

In the final press both the locking forks 21 and the stop members 19 are moved out of the pressing chamber 16, and thereafter the pressing commences in the chamber 16 (as shown in FIGS. 15 & 16). When the press die 17 passes the position 850 mm (shown in FIG. 17a), the lateral force device 23 returns to its outer position according to FIG. 11. At the level of 700 mm (shown in FIG. 16a) a limit switch 24 is actuated. After a desired adjustable holding time of the pressing effect, the press die 17 slowly returns to the level of 850 mm and remains in this position after impulse from a limit switch 25 (FIGS. 17 & 17a). The limit switches 24, 25 are actuated by members provided on the movable press die unit. The levels mentioned have been chosen as examples for the pressing of a particular textile fibre material, but also other levels can be suitable in the case of another textile fibre material.

A complete bale preferably consists of three layers corresponding to three supplies from the pre-pressing chamber 7. At the first partial pressing the press die 17 starts its upward movement from the level of 850 mm when a new layer is ready to be supplied from the chamber 7. At the second and third partial pressing, the press die 17 starts its upward movement from the same position, but before that the stop members 19 have been moved into the pressing chamber 16 to prevent the compressed fibre material from the first and, respectively, the second partial pressing to expand upward. At the final pressing of three layers, the contact pressure against the bale by the walls 26 opposed to the pressing chamber can be limited. The walls 26 are actuated each by two hydraulic motors 27 (shown in FIG. 16), and the oil pressure for these motors can be adjusted to a suitable value by means of a safety valve 28, so that a maximum specific lateral pressure on the bale of 25 kg per $cm^2$ is obtained. After the press die 17 has returned to the level 850 mm (as shown in FIG. 17a), two covers 29 in the lower portion of the chamber 16 are opened. Said covers, which during the pressing operation constitute a portion of one side of the chamber 16, bridge the distance all the way to a roller conveyor arrangement 37 in a packing and binding device, which is described in greater detail below. By means of an aditional valve 30 (shown in FIG. 16) the hydraulic motors preferably are relieved from pressure, and thereby also the walls 26 are relieved. Alternatively, a pressure is maintained which is substantially lower than the pressure during the pressing operation. The lateral friction on the bale thereby has been reduced, which facilitates the movement in lateral direction. Said movement takes place by means of an ejector 32 operated by a hydraulic motor 31. Inasmuch as the completely pressed bale (after its release from the press) expands insignificantly transversely to the pressing direction, an outward movement of the walls 26 of about 40 mm normally is sufficient to reduce the lateral friction to a necessary degree. Within the completed bale there are relatively great expansion forces in the direction of pressing, which forces, however, are not too great to prevent lateral movement from taking place without difficulty between the two roller conveyors 37 from the opening 16b (as shown in FIG. 17a).

Figure 1:
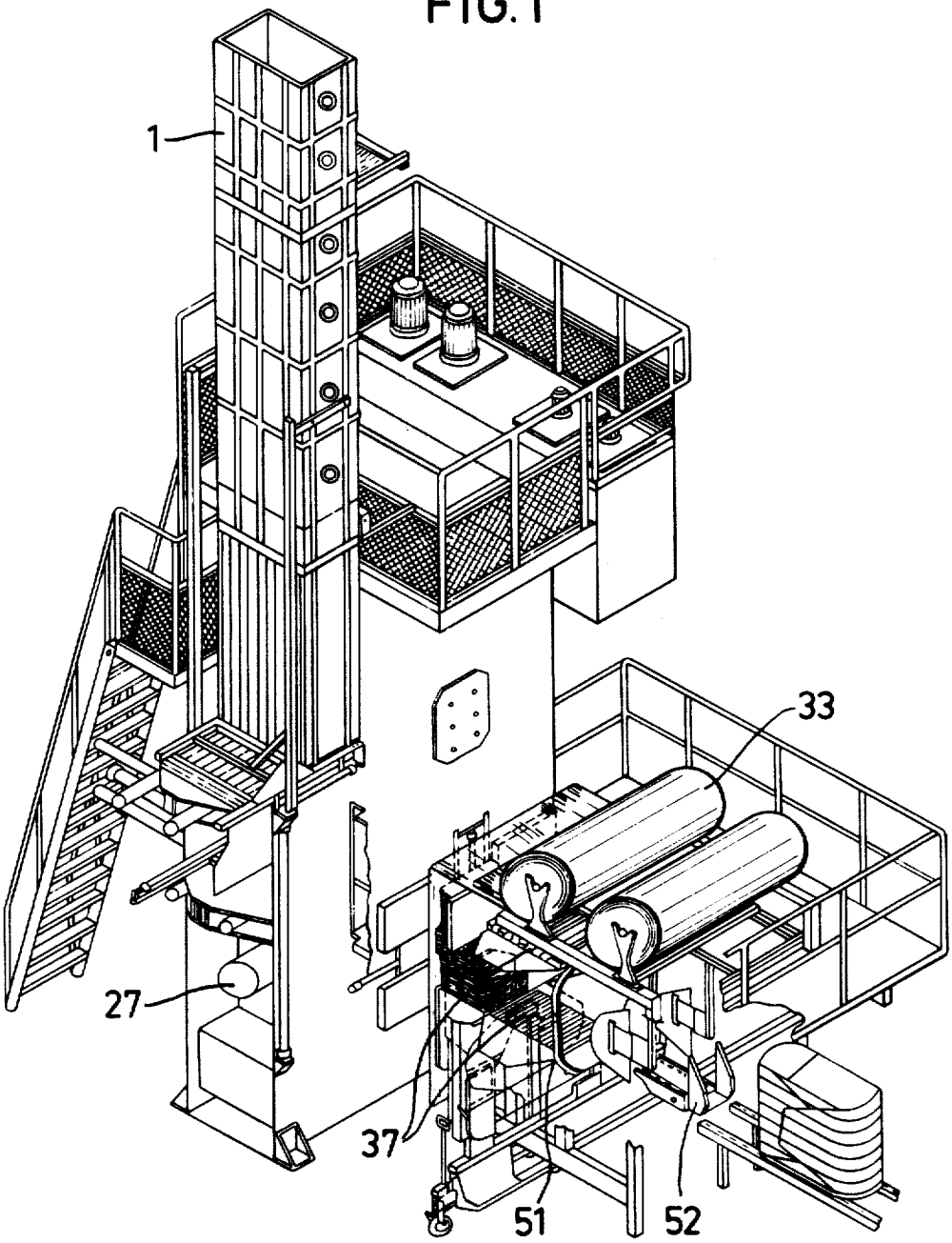
FIG. 1 is a perspective view of the apparatus according to the invention.
Figure 2:
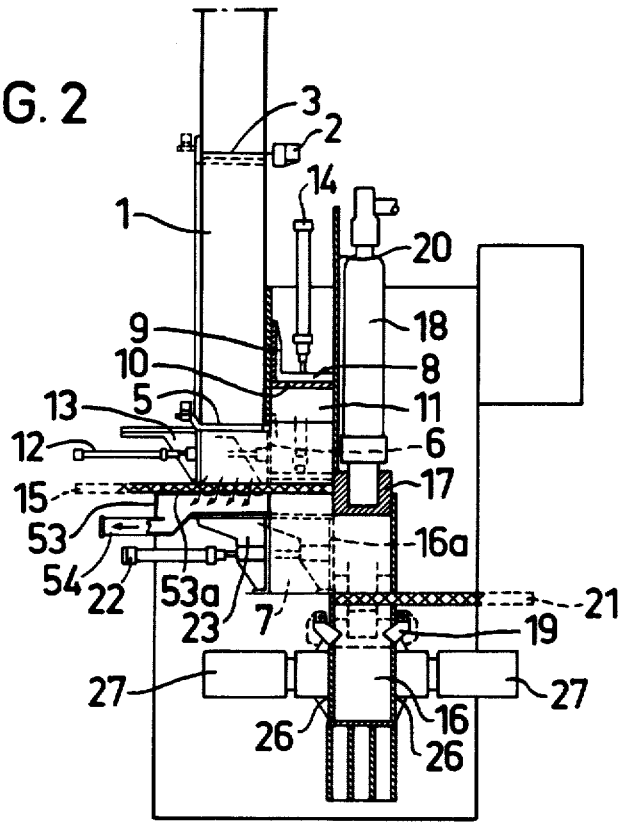
FIG. 2 is a longitudinal section through the apparatus.
Figure 3:
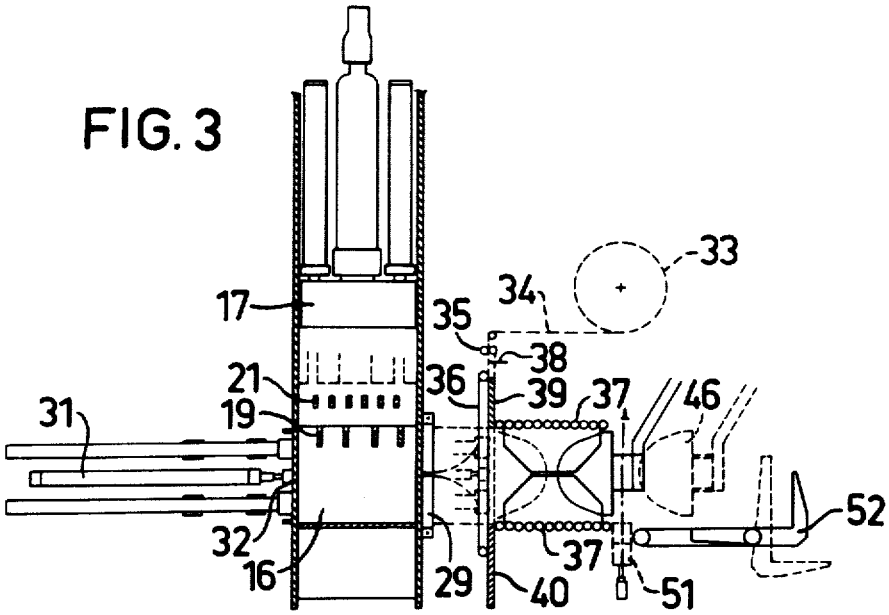
FIG. 3 is a longitudinal section through the discharge portion of the apparatus.
Figure 20:
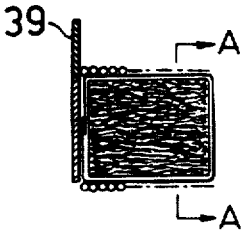
Figure 20A:
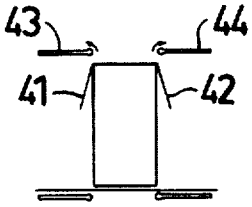
Figure 20B:
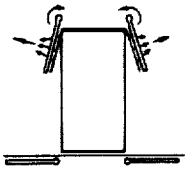
Figure 20C:
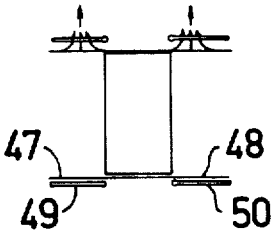
Figure 21:
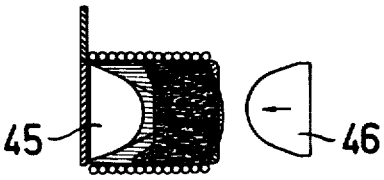
Figure 22:
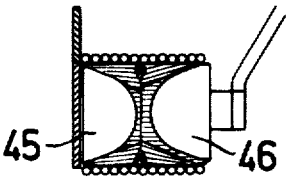
Figure 23:
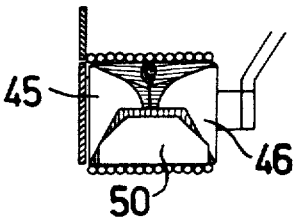
Figure 24:
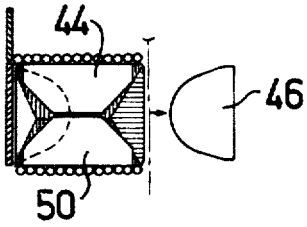

The air enclosed in the voluminous fibre material escapes between the forks 15 at the first step (compression) nd is exausted through box 53 with outlet 54 (as shown in FIG. 2). Thereby an air stream upward in the shaft 1 is prevented, which could render the downward fall of the fibre material difficult. Venting also can take place from the pre-pressing chamber 7 thereby, in that the grooves between the strips 11 in lateral direction connect to the box 53. In subsequent steps normally no venting is required. The upper wall 53a of the box 53 is preferably performated to permit air passage while the fibres remain on the upper side of the wall 53a. The outlet 54 is connected to a fan for efficient evacuation. The fan also creates a vacuum in the shaft, whereby leakage of fibres into the room through gaps on the shaft is prevented. The packing and binding of the bale advantageously can be carried out by the apparatus which schematically is shown in FIG. 3. and FIGS. 18–24. From a material reel 33 packing material 34 is fed by rolls 35 and belt conveyors 36 down in front of the roller conveyors 37. As already mentioned, a suitable material is laminated polyethylene fabric, but other types of material may be used. At the desired advanced length the packing is cut off by a knife 38. The ejector 32 operated by the hydraulic motor 31 then moves the bale out from the press and in between the roller conveyors 37. Here the packing is formed on the front side, upper side and lower side of the bale. After the ejector has returned, the upper cutoff packing portion is moved to the rear end of the bale when a folding metal sheet 39 moves downward. At the next moment, corresponding lower packing tips are folded upward against the bale by an underlying folding metal sheet 40 upon its upward movement. Now the lateral tips are to be folded inward against the bale in its prevailing position, in which connection special measures are required for the upper tips 41 and 42. Due to the low stiffness of the packing, said tips suspend down by their own weight and must be lifted for obtaining a good folding result when the rearward and forward lateral tips are being folded inward. Said lifting can be effected by means of upper lateral folding metal sheets 43 & 44 (as shown in FIG. 20a), which at the moment of lifting communicate with a vacuum source (not shown). The lateral folding sheets are moved down against the tips, which are then attached by suction to the sheets, whereafter the tips follow along with the sheets upwards to substantially horizontal position and are here retained until the rearward lateral tips have been folded forward against the sides of the bale by rearward folding metal sheets 45 and the forward lateral tips have been folded rearward against the bale sides by forward folding metal sheets 46. This procedure is shown in FIGS. 21 and 22. The rearward folding metal sheets 45 are mounted pivotally in the folding metal sheet 40 and participate in the upward and downward movements thereof. The folding sheets 46 are attached in special members and can be moved aside to the position indicated by the dashed lines in FIG. 3 in order not to obstruct the binding of the bale. The lower lateral tips 47 and 48 are folded up at the next moment by folding sheets 49 and 50, whereafter the upper lateral tips 41 and 42 are folded down by the folding sheets 43 and 44, whereafter the folding sheets 46 return to their position of being mounted aside.

After completion of the packing, the bale is moved by the roller conveyors 37, of which at least one comprises driven rollers, to a position for re-binding the first wire or tape. Wire binding can be carried out by a well known binding machine 51, as schematically indicated in FIG. 3. By stepped advancing, the desired number of wires then can be wound about the bale.

The completed bale then is moved by the roller conveyors 37 to a bale turner 52, which positions the bale on its forward plane end for further transport. The bale will expand in the pressing direction, so that the surfaces facing toward the roller tables 37 after the discharge from the roller tables will be curved and, therefore, not suitable to serve as support surfaces. During the turning operation, the forward folding sheets 46 serve as guide sheets in order to prevent tilting. The folding sheets 43, 44, 49, 50 and 45 return to their starting positions immediately after the completion of the binding, and a new packing is fed down between the feed rolls 35 and the belt conveyors 36. The packing is cut off by the knife 38, and the folding sheet 40 is returned to its lower position to render the insertion of a new bale between the roller conveyors 37 possible. The aforedescribed packing and binding procedure is thereafter repeated. All of these operations can be carried out fully automatically. It further may be stated that for textile fibres the specific final pressing effect on the bale usually is 10–100 kg per $cm^2$, suitably 25–75 kg per $cm^2$ and preferably 45–55 kp per $cm^2$. The final pressing can be carried out as far as to the height of 60–90 percent, suitably 70–85 percent and preferably about 80 percent of the bale height after the expansion in the press. Hereafter the expansion step immediately can take place, but a holding time of several seconds may be advantageous, during which time the press die remains in the lower position. Under certain conditions, however, the holding time can be chosen substantially longer. The substantially lower pressing effect maintained after the expansion usually is 0.5–4.0 kg per $cm^2$, suitably 1.0–3.0 kg per $cm^2$ and preferably about 2 kg per $cm^2$. After the binding and removal of the pressure, i.e. when the bale is entirely ready and free, the pressed surfaces expand so that the height is some percent greater at the edges and 5–10 percent greater at the centre between the wires or tapes. The expansion and thereby the forces of expansion, must be held within the limits required so that the strength values of the wire or tape are not exceeded.

Bale presses according to the invention can be designed for bale dimensions within wide limits. A suitable size for bales containing textile fibres is a length of about 1050 mm, width of 550 mm and height of 900–1000 mm. The density may vary from 125–350 kp per $m^3$. When the fibre material is being supplied to the press, the density may be as low as 10 kg per $m^3$. The great variations in density are a function of the different types of fibres, for example rayon, dacron, trevira, etc. The fibres, besides, vary in length and thickness. The bailing capacity of presses according to the invention is high. For rayon fibres and at the above bale dimension, 80 to 100 tons per 24 hours can be obtained. The bales contain prima fibres, i.e. fibres which are not broken or damaged in any way by the pressing operation. The fibres are homogenous and easy to dissolve at the spinning mills. The invention, of course, is not restricted to the particular embodiment described, but can be varied by those skilled in the art within the scope of the invention as recited in the attached claims.

What is claimed is:

[1. A method of baling material, including the steps of supplying layers of said material into a pressing chamber, compressing the material after each layer is received by applying a first compression force to each of said layers in turn, applying a greater compression force to all of said layers at once after receipt of a last layer, partially reducing said greater compression force after a predetermined time so that the compressed material in the shape of a bale is permitted to expand, and thereafter binding said material into a bale while said partially reduced compression force upon said bale is maintained.]

2. A method according to claim [1,] *22,* wherein the supplied layers, after each compression, are retained in a lower portion of said pressing chamber by means of stop members.

[3. A method according to claim 1 or 2, wherein said material layers are compressed prior to their supply into said pressing chamber.]

4. A method according to claim [3,] *22,* wherein [each layer, prior to its entrance into said pressing chamber, is built up of several partial layers in a prepressing chamber, which] *said* partial layers are supplied through a closable opening in said pre-pressing chamber, and compression is applied upon each supplied partial layer in turn until the desired number of partial layers is obtained, whereafter said layer is supplied without expansion into said pressing chamber.

5. A method according to claim 4, wherein each partial layer, prior to its entrance into said pre-pressing chamber, is formed of *fibrous textile* material permitted to fall in a shaft from an opening at the top of said shaft, so that said *fibrous textile* material is uniformly distributed over a horizontal cross-section of said shaft, whereafter said partial layer is supplied without expansion into said [prepressing] *pre-pressing* chamber.

6. A method according to claim 5, wherein said *fibrous textile* material for forming said partial layer is permitted to continuously fall into an upper portion of said shaft afterwhich the material is transferred to a lower portion of said shaft for compression when a predetermined amount of material is obtained in the partial layer, and at the same time a new partial layer is formed in said upper portion of said shaft.

[7. A method according to claim 1, further comprising the step or packing said bale in a coherent packing sheet after it has been removed from said pressing chamber while said partially reduced compression force is maintained and before said binding takes place.]

8. A method according to claim [1,] *22,* wherein said binding is carried out with a strip, with tension maintained in said strip, and said binding is carried out with a plurality of windings while said bale is advanced in steps.

[9. Apparatus for pressing and binding voluminous material into bales, comprising: a pressing chamber having a press die, a closable opening for receiving layers of material to be pressed, and a discharge opening for discharging pressed bales, said press die being adapted for pressing a plurality of said layers into the shape of a completed bale; a pre-pressing chamber for receiving material and pressing it into a layer; means for delivering each such layer from said pre-pressing chamber to said pressing chamber; means for controlling said press die to press said completed bale with a predetermined high pressure, and for subsequently partially lowering said pressure; binding means for binding said bale; and means provided to maintain said partially lowered pressure on said bale during transfer of said bale from said pressing chamber to said binding means and during said binding.]

10. An apparatus according to claim [9,] *23,* wherein said [pressing chamber in its lower portion if provided with] *means for maintaining each of said layers under pressure comprises* stop members *in said pressing chamber* to retain *said* compressed layers in a compressed state when said press die is being lifted.

11. An apparatus according to claim [9,] *23,* wherein *said closable opening includes a lower edge, and including* extendible locking forks [are] are provided in said pressing chamber on the same level as [the] *said* lower edge of said [receiving] *closable* opening [thereof], which forks serve as support apparatus upon the introduction of said layers through said [receiving] *closable* opening.

12. An apparatus according to claim [9,] *23,* wherein a lateral force device is provided for inserting said layers through said [receiving] *closable* opening, which lateral force device also is capable of holding said [supply] *closable* opening closed while said pressing is occurring in said pressing chamber.

[13. An apparatus according to claim 9, wherein a lower portion of said pre-pressing chamber connects with said pressing chamber through said receiving opening of said pressing chamber, and said pre-pressing chamber, at an upper portion thereof, is provided with a closable supply opening for receiving said partial layers.]

[14. An apparatus according to claim 13, wherein extendible locking forks are provided in said pre-pressing chamber on the same level as the lower edge of said supply opening for preventing expansion of underlying material and to serve as support upon the introduction of said partial layers.]

15. An apparatus according to claim [13,] *23,* wherein a lateral movement device is provided for introducing said partial layers through said pre-pressing chamber supply opening into said prepressing chamber, and said lateral movement device also is capable of holding said opening closed while said pressing is occurring in said pre-pressing chamber.

16. An apparatus according to claim [13,] *23,* wherein a shaft is provided adjacent to said [second] pre-pressing chamber for compressing [said] *fibrous textile* material *supplied thereto to form said partial layers*

*of fibrous textile material*, a lower portion of said shaft being in connection with said pre-pressing chamber through said supply opening of said pre-pressing chamber, said shaft being open upwardly for being supplied with said material[,] and *wherein* extendible compression forks movable up and down along said lower portion of said shaft extend inward through slots in the lower portion of a wall of said shaft for compressing said *fibrous textile* material into *said* partial layers.

17. An apparatus according to claim 16, wherein said shaft, in an upper portion, is provided with a damper for closing off the supply of said material, and with a weighing mechanism provided for control of said damper in the central portion of said shaft to determine the weight of the amount of material for each partial layer.

18. An apparatus according to claim 16, wherein said shaft and said pre-pressing chamber connect with a vent box provided with an outlet connected to a fan for removing air from said [prepressing] *pre-pressing* chamber and said shaft.

19. An apparatus according to claim [9,] *23*, wherein[, outside of said discharge opening of said pressing chamber, a] *said means for maintaining said partially lowered pressure on said bale comprises* lower and [an] upper roller [conveyor are] *conveyors* provided *outside of said discharge opening of said pressing chamber*, [which conveyors maintain said partially lowered pressure on said bale,] and wherein at least one of said roller conveyors comprises driven rollers for advancing said bale.

20. An apparatus according to claim [9,] *23*, wherein [side walls of] said pressing chamber *includes outwardly movable side walls* at said discharge opening [are movable outward] for partially [relieveing] *relieving* lateral pressure against said bale.

[21. An apparatus according to claim 9, wherein means are provided for packing said bale while maintaining said partially lowered pressure theron, said means being located between said discharge opening of said pressing chamber and said binding device.]

*22. A method of baling fibrous textile material, including the steps of supplying partial layers of said fibrous textile material into a pre-pressing chamber, compressing the fibrous textile material after each partial layer is received in said pre-pressing chamber so as to provide a pre-pressed layer of said fibrous textile material, supplying said pre-pressed layers to a pressing chamber, compressing said plurality of pre-pressed layers by applying a first compression force to each of said pre-pressed layers in turn, applying a greater compression force to all of said pre-pressed layers at once after receipt of a last pre-pressed layer, partially reducing said greater compression force after a predetermined time so that the compressed fibrous textile material in the shape of a bale is permitted to expand, removing said bale from said pressing chamber while maintaining said partially reduced compression force, packing said bale in a coherent packing sheet while maintaining said partially reduced compression force, and thereafter binding said fibrous textile material into a bale while said partially reduced compression force upon said bale is maintained.*

*23. Apparatus for pressing and binding voluminous fibrous textile material into bales, comprising: a pre-pressing chamber for receiving fibrous textile material and pressing it into layers, said pre-pressing chamber, at an upper portion thereof, being provided with a closable supply opening for receiving partial layers of said fibrous textile material, and extendable locking forks being provided in said pre-pressing chamber on the same level as the lower edge of said supply opening for preventing expansion of underlying material and to serve as a support upon the introduction of said partial layers into said pre-pressing chamber; a pressing chamber having a press die, a closable opening communicating with a lower portion of said pre-pressing chamber for receiving said layers of fibrous textile material to be pressed, and a discharge opening for discharging a pressed bale, said press die being adapted for pressing a plurality of said layers into the shape of a completed bale; means for delivering each said layer from said pre-pressing chamber to said pressing chamber; means for maintaining each of said layers under pressure during said pressing of said plurality of layers; means for controlling said press die to press said completed bale with a predetermined high pressure, and for subsequently partially lowering said pressure; means for removing said bale from said pressing chamber; means for packing said bale while maintaining said partially lowered pressure thereon; binding means for binding said bale; and means provided to maintain said partially lowered pressure on said bale during transfer of said bale from said pressing chamber to said binding means and during said binding.*

*24. Apparatus for pressing and binding voluminous fibrous textile material into bales, comprising: a pre-pressing chamber for receiving fibrous textile material and pressing it into layers, said pre-pressing chamber, at an upper portion thereof, being provided with a closable supply opening for receiving partial layers of said fibrous textile material, and a lateral movement device being provided for introducing said partial layers through said pre-pressing chamber supply opening into said pre-pressing chamber, said lateral movement device also being capable of holding said supply opening closed while said pressing is occurring in said pre-pressing chamber; a pressing chamber having a press die, a closable opening communicating with a lower portion of said pre-pressing chamber for receiving layers of fibrous textile material to be pressed, and a discharge opening for discharging a pressed bale, said press die being adapted for pressing a plurality of said layers into the shape of a completed bale; means for delivering each said layer from said pre-pressing chamber to said pressing chamber; means for maintaining each of said layers under pressure during said pressing of said plurality of layers; means for controlling said press die to press said completed bale with a predetermined high pressure, and for subsequently partially lowering said pressure; means for removing said bale from said pressing chamber; means for packing said bale while maintaining said partially lowered pressure thereon; binding means for binding said bale; and means provided to maintain said partially lowered pressure on said bale during transfer of said bale from said pressing chamber to said binding means and during said binding.*

*25. An apparatus according to claim 24, wherein said means for maintaining each of said layers under pressure comprises stop members in said pressing chamber to retain said compressed layers in a compressed state when said press die is being lifted.*

*26. An apparatus according to claim 24, wherein said closable opening includes a lower edge, and including extendible locking forks provided in said pressing chamber on the same level as said lower edge of said closable opening, which forks serve as support apparatus upon the introduction of said layers through said closable opening.*

*27. An apparatus according to claim 24, wherein a lateral force device is provided for inserting said layers through said closable opening, which lateral force device*

*also is capable of holding said closable opening closed while said pressing is occurring in said pressing chamber.*

*28. An apparatus according to claim 24, wherein a shaft is provided adjacent to said pre-pressing chamber for compressing fibrous textile material supplied thereto to form said partial layers of fibrous textile material, a lower portion of said shaft being in connection with said pre-pressing chamber through said supply opening of said pre-pressing chamber through said supply opening of said pre-pressing chamber, said shaft being open upwardly for being supplied with said material; and wherein extendible compression forks movable up and down along said lower portion of said shaft extend inward through slots in the lower portion of a wall of said shaft for compressing said fibrous textile material into said partial layers.*

*29. An apparatus according to claim 28, wherein said shaft, in an upper portion, is provided with a damper for closing off the supply of said material, and with a weighing mechanism provided for control of said damper in the central portion of said shaft to determine the weight of the amount of material for each partial layer.*

*30. An apparatus according to claim 28, wherein said shaft and said pre-pressing chamber connect with a vent box provided with an outlet connected to a fan for removing air from said pre-chamber and said shaft.*

*31. An apparatus according to claim 24, wherein said means for maintaining said partially lowered pressure on said bale comprises lower and upper roller conveyors provided outside of said discharge opening of said pressing chamber, and wherein at least one of said roller conveyors comprises driven rollers for advancing said bale.*

*32. An apparatus according to claim 24, wherein said pressing chamber includes outwardly movable side walls at said discharge opening for partially relieving lateral pressure against said bale.*

* * * * *

UNITED STATES PATENT AND TRADEMARK OFFICE

CERTIFICATE OF CORRECTION

PATENT NO. : Re. 31,944

DATED : August 16, 1985

INVENTOR(S) : Nils E. stromberg

It is certified that error appears in the above-identified patent and that said Letters Patent is hereby corrected as shown below:

Column 8, line 33, delete "are" (second occurrence).
Column 9, line 5, "[,]" should read --[,];--.
Column 11, line 9, delete entire line.

Signed and Sealed this

*Fifteenth* Day of *October 1985*

[SEAL]

*Attest:*

DONALD J. QUIGG

*Attesting Officer*

*Commissioner of Patents and Trademarks—Designate*